(12) United States Patent
Quesada

(10) Patent No.: US 11,353,148 B2
(45) Date of Patent: Jun. 7, 2022

(54) SEALING AND RESTRAINT SYSTEM FOR JOINING PLASTIC PIPE SECTIONS HAVING PRE-FORMED SOCKETS

(71) Applicant: S & B Technical Products, Inc., Fort Worth, TX (US)

(72) Inventor: Guido Quesada, San Jose (CR)

(73) Assignee: S & B Technical Services, Inc., Fort Worth, TX (US)

( * ) Notice: Subject to any disclaimer, the term of this patent is extended or adjusted under 35 U.S.C. 154(b) by 190 days.

(21) Appl. No.: 16/801,874

(22) Filed: Feb. 26, 2020

(65) Prior Publication Data
US 2020/0292109 A1    Sep. 17, 2020

Related U.S. Application Data

(60) Provisional application No. 62/816,268, filed on Mar. 11, 2019.

(51) Int. Cl.
*F16L 21/03*    (2006.01)

(52) U.S. Cl.
CPC .................. *F16L 21/03* (2013.01)

(58) Field of Classification Search
CPC ... F16L 17/032; F16L 37/0845; F16L 37/091; F16L 37/092; F16L 37/0925; F16L 47/08; F16L 47/10
USPC ........ 285/379, 375, 374, 338, 110, 109, 108
See application file for complete search history.

(56) References Cited

U.S. PATENT DOCUMENTS

| | | | |
|---|---|---|---|
| 2,657,078 A | 10/1953 | Virgil | |
| 2,960,359 A | 11/1960 | Leland | |
| 6,974,160 B2 | 12/2005 | Jones | |
| D514,671 S | 2/2006 | Jones | |
| 7,310,867 B2 | 12/2007 | Corbett, Jr. | |
| 7,328,493 B2 | 2/2008 | Jones et al. | |
| 7,537,248 B2 | 5/2009 | Jones et al. | |
| 8,444,186 B2 | 5/2013 | Jones et al. | |
| 9,038,258 B2 | 5/2015 | Liao et al. | |
| 9,593,787 B2 | 3/2017 | Monteil et al. | |
| 9,829,137 B2 * | 11/2017 | Kennedy, Jr. | F16L 37/0925 |
| 10,107,425 B2 | 10/2018 | Corbett, Jr. et al. | |

(Continued)

OTHER PUBLICATIONS

International Search Report; PCT Application PCT/US21/70195; dated May 7, 2021; p. 1-2; Alexandria VI.

*Primary Examiner* — Aaron M Dunwoody
(74) *Attorney, Agent, or Firm* — Whitaker Chalk Swindle & Schwartz PLLC; Charles Gunter

(57) ABSTRACT

A seating and restraint system is shown for joining the spigot and socket ends of two sections of plastic pipe to form a pipe joint. The socket pipe ends are preformed at the factory with an internal raceway which receives both a sealing ring and a companion gripping ring. The sealing ring is an elastomeric member having a periphery with a protruding ear formed at one circumferential location. The companion gripping ring is a hardened member having one opening gap in the circumference thereof. The protruding ear on the sealing ring fits within the opening gap in the gripping ring, engagement of the protruding ear within the opening gap serving to prevent extrusion of the sealing ring within the gap in the gripping ring and also limiting closure of the gripping ring after engagement of the spigot end with the socket pipe end as the pipe joint is assembled.

5 Claims, 16 Drawing Sheets

(56) References Cited

U.S. PATENT DOCUMENTS

2018/0094754 A1     4/2018   Quesada
2020/0292109 A1     9/2020   Quesada

\* cited by examiner

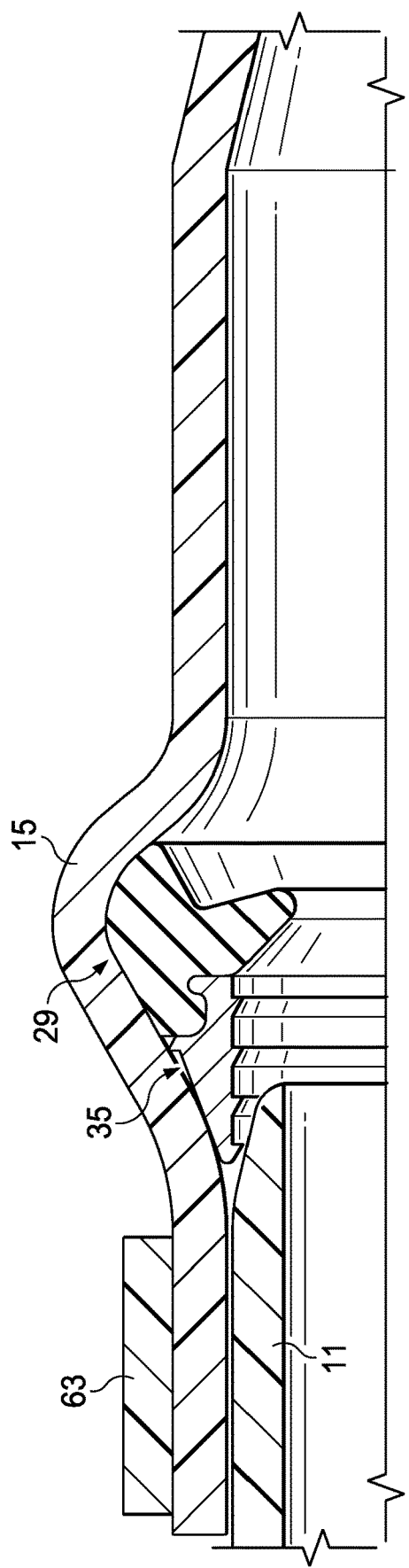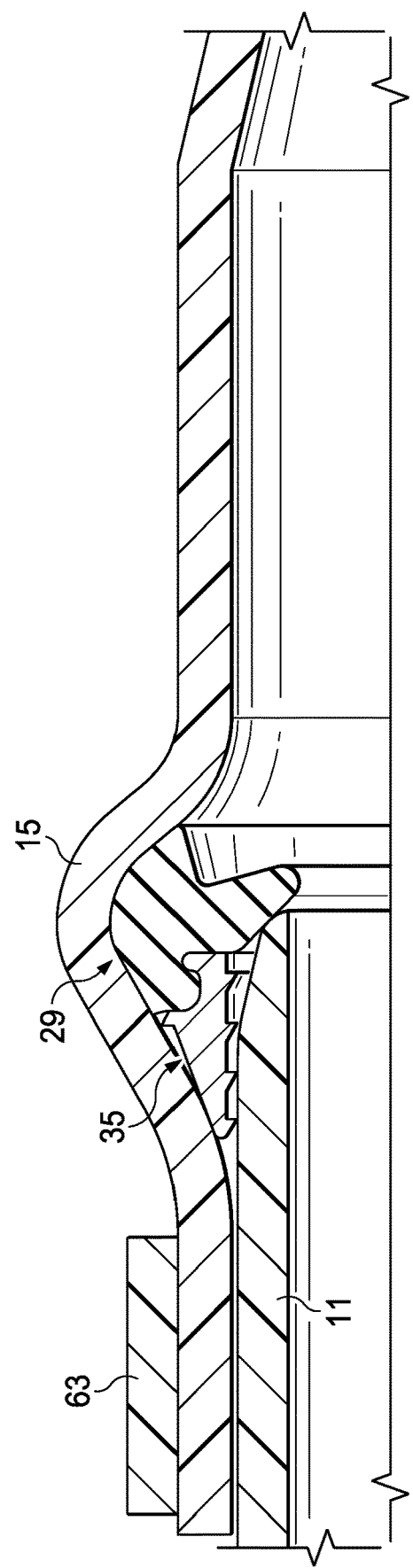

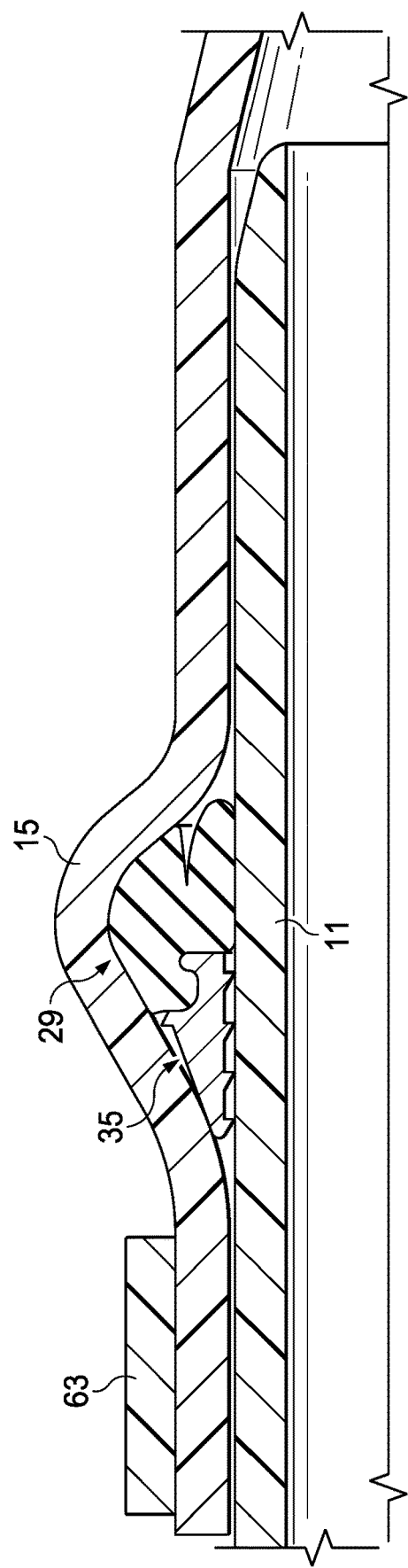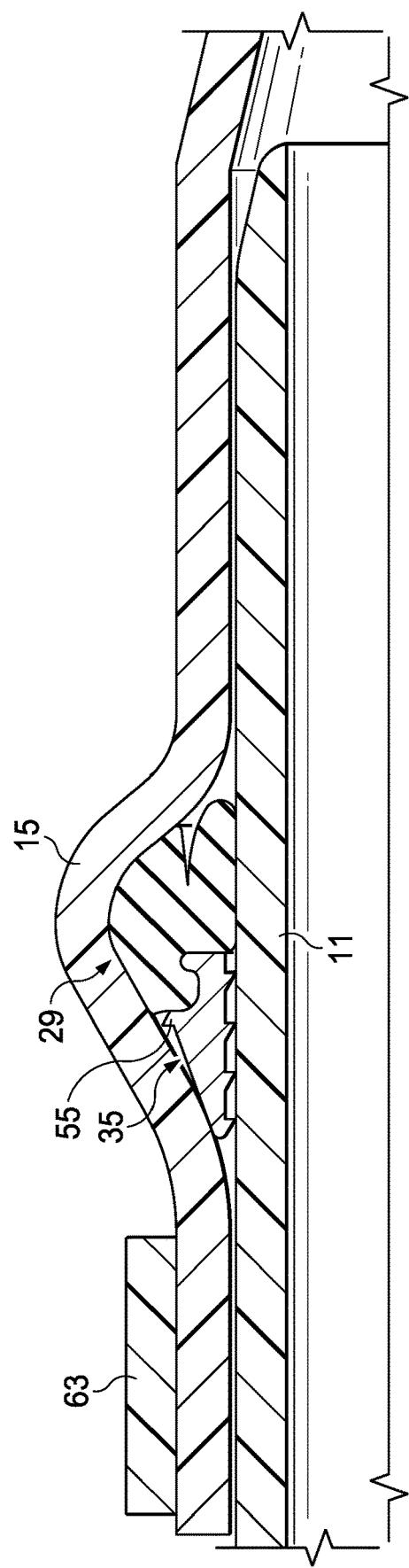

SEALING AND RESTRAINT SYSTEM FOR JOINING PLASTIC PIPE SECTIONS HAVING PRE-FORMED SOCKETS

CROSS REFERENCE TO RELATED APPLICATION

The present application claims priority from a previously filed U. S. Provisional Patent Application Ser. No. 62/816,268, filed Mar. 11, 2019, by the same inventor and with the same title.

BACKGROUND OF THE INVENTION

Field of the Invention

The present invention relates generally to sealing systems used for forming pipe joints in plastic pipelines in which a sealing element and a companion restraint element are installed within a preformed raceway provided in a belled pipe end of a section of pipe used to form the pipe joint.

Description of the Prior Art

Pipes formed from thermoplastic materials including polyolefins such as polyethylene, polypropylene and PVC are used in a variety of industries. For example, such pipes are commonly used in municipal water and sewer applications. In forming a joint between sections of pipe, the spigot or male pipe end is inserted within the female or socket pipe end. The actual manufacture of the mating sections of plastic pipe typically involves the reforming (belling) of the end of the pipe by reheating and shaping to some desired profile to provide a means of mating with the opposing end of the next pipe. The art of forming sockets (also called bells) on plastics pipes is well established, and there are numerous processes and methods in the literature. An annular, elastomeric ring or gasket is typically seated within a groove or "raceway" formed in the socket end of the thermoplastic pipe to assist in forming a sealed pipe joint between adjoining sections of pipe. As the spigot is inserted within the socket, the gasket provides the major seal capacity for the joint.

In recent years, pipe systems employing the so called "PVC-O" pipe have become increasingly popular. The designation "PVC-O" stands for polyvinylchloride oriented, sometimes referred to simply as molecularly oriented pipe, or "MOP." It is well established in the literature that molecular orientation of plastics can provide enhanced mechanical properties for plastic pipe of the type under consideration, and such materials are commonly used for plastics pipes. The molecularly oriented thermoplastic materials enhance the strength of the article in certain directions by orienting the molecules in the plastic material in such directions.

Orientation is achieved by drawing or stretching the material under appropriate conditions of temperature, such that a strain (i.e. deviation from the originally formed dimensions) is induced in the plastics material to cause alignment of the molecules, and thereafter cooling the material while drawn to lock in that strain. A number of methods have been proposed whereby this principle is applied to plastic pipes, in particular in order to enhance their strength under internal pressure by circumferential and/or axial forces, or by external forces acting on the pipeline.

For example, U.S. Pat. No. 4,428,900, shows a pipe of oriented thermoplastic polymeric material having an integral socket which is manufactured by expanding a tubular blank. The tubular blank is heated by circulation of hot water to a temperature at which deformation will induce orientation of the polymer molecules. The blank is then expanded radially outward against a mold by application of internal pressure.

U.S. Pat. No. 5,449,487, shows an apparatus and method for orienting plastic pipe. A heated pipe is oriented radially by means of a conically widening mandrel which is located downstream of the plastic extruder.

The above examples are intended merely to be illustrative of the general state of the art in the manufacture of molecularly oriented pipe.

Whether the pipeline system in question is the more ordinary PVC pipeline, or the more exotic PVC-O pipeline, it is often desirable to provide a "restrained joint" to insure that the spigot or male pipe end and the female or socket end do not separate due to internal or external forces, such as hydraulic forces that exist inside the pipeline, or external forces, such as bends in the direction of the pipeline, earthquakes or ground movement, and the like. This need exists for both pipe sections having pre-formed sockets, as well as pipe ends in which the sealing and restraint system is integrally installed during manufacture in a "Rieber" style pipe belling operation. The present invention is specifically directed toward joint restraints to be installed in existing pre-formed pipe sockets.

The problem of providing a sealing and restraint system is exacerbated in the case of PVC-O pipe joints in that the prevalent socket end is often provided with an "Anger Raceway" for receiving the sealing gasket. Since an advantage of PVC-O pipe is that it can be thinner with the same type strength as traditional PVC pipe, the Anger Raceway has a different geometry than the traditional socketed grooves provided in the more traditional "Rieber" gasket sealing systems for traditional PVC pipe. This geometry has proved to be more difficult problem from the standpoint of providing a securely sealed joint than the traditional PVC pipe joint.

One approach to joining molecularly oriented pipe with a "restrained joint" was presented in U.S. Patent Publication No. 2011/0062700 to Corbett, Jr., assigned to the assignee of the present invention. That publication disclosed a method for joining molecularly oriented pipe in which a coupling is provided which is formed of a material other than molecularly oriented pipe, such as ordinary PVC pipe. The coupling is formed as a tubular body with a combination sealing and restraint mechanism located in each of two opposing end openings of the coupling that seal and restrain mating plain spigot ends of the molecularly oriented pipe. Because the coupling is made of a material such as ordinary PVC, the sealing and restraint mechanisms can be installed in internal grooves provided in the coupling interior during normal pipe belling operations without introducing unacceptable levels of stress or strain into the product. While providing a workable solution, that approach had the disadvantage of requiring more coupling components, adding to the cost of each joint in the pipeline system.

Other approaches to the problem have included the use of metal segments embedded in the rubber of the sealing element or in a combination of rubber and plastic. See, in this regard, the Forsheda patent publication EP 2 664 833A1 which shows a pipe seal for sealing a joint between a first pipe a second pipe, said pipe seal comprising a carrier member and a sealing member attached to the carrier member. The carrier member comprises at least one retaining insert for gripping the second pipe (42).

Also, see U.S. Pat. No. 7,618,071, issued Nov. 17, 2009, to Jones et. al, assigned to the assignee of the present invention, which shows various versions of a restraint system for joining plastic pipe. The restraining/sealing mechanism includes a relatively rigid gripper ring and a companion sealing ring which are received within one or more mating grooves provided in the belled end of a female pipe. The gripper ring and sealing ring can be combined or attached, or they can be separate members located in the same retaining groove or separate grooves in the female belled pipe end.

Despite these advances in the art, there are presently no other commercially available solutions which address all of the above problems known to Applicant. The existing solutions have a limited pressure range and, in the case of molecularly oriented pipe are often less than satisfactory due, in part, to the hard and relatively brittle nature of the molecularly oriented pipe.

A need continues to exist, therefore, for improved techniques for manufacturing and joining plastic pipe and, particularly molecularly oriented pipe, which techniques take into account the unique properties of these types of molecularly oriented plastic materials.

SUMMARY OF THE INVENTION

A sealing and restraint system is shown for joining a first longitudinal section of plastic pipe to a second longitudinal section of plastic pipe to form a secure pipe joint. Each of the sections of plastic pipe each has a spigot for mating with a socket end of a next adjacent pipe section, the socket ends each being preformed with an internal raceway formed adjacent a mouth opening thereof which is formed during the manufacture of the pipe section.

A sealing element is installed within the raceway of the socket end of one section of plastic pipe, the sealing element comprising an elastomeric sealing ring having a periphery and having a protruding ear located at one circumferential location about the periphery thereof. The sealing element can conveniently be installed by temporarily collapsing the sealing element inwardly upon itself and positioning the sealing element in the raceway, and thereafter allowing the sealing element to return to a normal uncollapsed state.

A companion restraining element is also located within the raceway of the socket end of the same section of pipe, the restraining element comprising a hardened gripping ring having an external peripheral surface and an internal peripheral gripping surface. The griping ring is provided with an opening gap at one circumferential location about the periphery thereof. The gripping ring has an external diameter and an internal diameter, and wherein the opening gap in the gripping ring can be forced closed to thereby temporarily decrease the external diameter of the gripping ring, so that it can be positioned within the pre-existing raceway in the socket end of the plastic pipe. The protruding ear of the sealing ring engages and fits within the opening gap in the gripping ring when the gripping ring is installed within the raceway of the socket end of the section of plastic pipe. Engagement of the protruding ear within the opening gap serves to prevent extrusion of the sealing ring within the gap in the gripping ring and also limits closure of the gripping ring after engagement of the spigot end with the socket pipe end as the pipe joint is assembled.

Preferably, the sealing ring and the gripping ring are provided with interlocking profiles which help to ensure retention of the sealing ring by the gripping ring after the sealing ring and gripping ring have been installed in the raceway within the socket end of the plastic pipe. In one preferred version of the invention, the sealing ring is formed as an annular gasket body made of a resilient elastomeric material, the annular gasket body having a leading nose region, an inner circumferential region and an outer circumferential region. The annular gasket body is installed within the raceway in the socket end of the plastic pipe so that the outer circumferential region forms a seal with the raceway and the inner circumferential region terms a sealing surface for an exterior surface of the mating spigot pipe end, and wherein a circumferential groove region is formed on the inner circumferential region of the gasket body which engages with a mating surface provided on the gripping ring to form the interlocking profile.

Preferably, the gripping ring has a leading nose region and a trailing tail region, as viewed in profile, the external peripheral surface of the gripping ring including a conical region which interfaces with a mating conical surface provided in the raceway of the socket pipe end at a given interface angle, the interface angle being in the range from about 10 to 30 degrees, most preferably from about 15 to 20 degrees.

The external peripheral surface of the gripping ring is preferably provided with a sharp circumferential protrusion which limits forward displacement of the gripping ring as it contacts the socket raceway, to thereby restrict the amount the gripping ring grips the pipe spigot end as the joint is being assembled.

An improved method is also shown for joining a first longitudinal section of plastic pipe to a second longitudinal section of plastic pipe to form a secure pipe joint using the previously described components of the sealing and restraint system and will be further described in the detailed description which follows. The two sections of plastic pipe can be molecularly oriented plastic pipe.

Additional objects, features and advantages will be apparent in the written description which follows.

BRIEF DESCRIPTION OF THE DRAWINGS

FIGS. 8-10 are simplified, quarter sectional views showing the gradual make-up of the spigot pipe end and the mating socket end of the plastic pipe sections utilizing the sealing and restraint system of the invention.

FIGS. 11 and 12 are similar views, but are particularly directed to the role of the protruding region on the external circumference of the gripping ring which limits the forward displacement of the gripping ring in the raceway as the pipe joint is assembled.

DETAILED DESCRIPTION OF THE INVENTION

Figure 1:
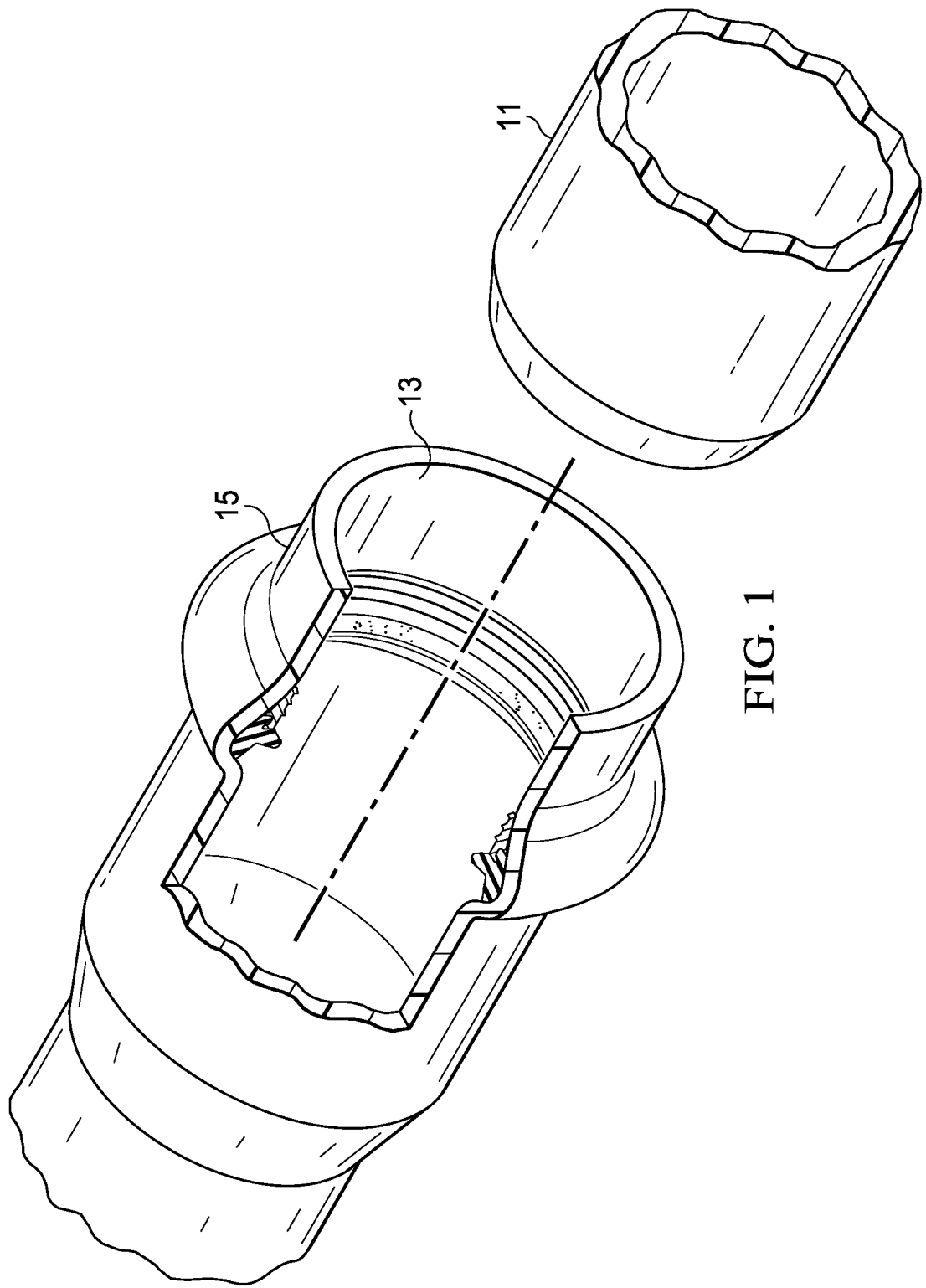
FIG. 1 is an end view of a socket section of molecularly oriented plastic pipe, partly broken away, and showing the socket end opening into which a mating spigot pipe end is about to be inserted.

As has been briefly discussed, fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove or "raceway" formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a stiffening band which was inserted into a mating groove provided on the internal diameter of the rubber ring. In the other prior art systems, a homogeneous rubber gasket body was bonded with an internal or external metal, or plastic, reinforcing band or art internal metal band or ring. Each of these solutions had critical limitations. In some cases, the prior art solutions failed to provide the needed joint integrity, often contributing to the complexity and expense of the manufacturing operation and field installation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belled pipe end, a rigid, embedded reinforcing ring could be supplied as a part of the gasket. Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, the belling operation was somewhat complicated and costly. Also, certain situations exist in which it would be desirable to manually remove one gasket and reinstall another within a preformed raceway in the selected pipe end, rather than utilizing an integrally installed gasket in which the groove in the pipe is formed around the gasket. For example, municipal and consulting engineers will specify specialty elastomers based on the pipelines end-use and soil conditions. While SBR is the most common rubber used in North America, engineers will specify EPDM based on water treatment technique, and nitrile rubber when there is hydrocarbon soil contamination due to gasoline or oil pollution. Distributors and contractors cannot exchange Rieber process gaskets in their pipe inventory.

It would therefore be advantageous to be able to install a gasket of the type having a reinforcing element within a previously belled pipe end, as opposed to those systems like the Rieber systems, where the female pipe end is formed about the sealing gasket during the manufacture of the female pipe end. In other words, it would be necessary for the gasket to be able to accept inverse curvature, to be installed in a preformed groove by hand, either at the manufacturing plant or in a field operation.

Plastic pressure pipe systems have been in use in the United States for potable (drinking) water systems since at least about the 1950s. The types of plastic pipe in commercial use in the world today include, for example, unplasticized polyvinyl chloride (referred to as PVC or PVC-U), acrylonitrile butadiene styrene (ABS), post chlorinated polyvinyl chloride, (CPVC), polypropylene (PP), polyethylene (PE), polyvinylidene fluoride (PVDF) and polybutylene (PB) and more recently the molecularly oriented plastics.

This newer form of plastic material used in plastic pipe manufacture is the so called "PVC Molecularly Oriented Pipe", sometimes called "PVC-O pipe" or simply "MOP" for simplicity. As has been briefly explained, these molecularly oriented thermoplastic materials often exhibit enhanced strength of the article in certain directions by orienting the molecules in the plastic material in such direction, whereby the tensile strength of the plastic increases and the stretch decreases in such direction. This can provide advantages, for example when applied to tubular articles, where orienting is effected in the radial direction, for instance to increase the pressure resistance of the pipe, or in the longitudinal direction of the pipe, for instance to increase the tensile strength of the pipe, or in both directions (biaxial orientation). In the case of PVC-O pipe systems for municipal water and sewer pipe, the molecular orientation approximately doubles the material strength, so that only about half the wall thickness for the same pipe class is required to be used to meet the applicable specifications.

A disadvantage of the molecularly oriented pipe (MOP), however, when used in such processes as the well known "Rieber" belling process is that the MOP is more difficult to bell. During the Rieber belling operation, a heated pipe end is forced over a forming mandrel which typically has a sealing ring, and perhaps other components, mounted about the mandrel. It is necessary to deform the heated pipe end as it passes over the forming mandrel and accommodates the sealing ring or other components. In some cases, the material of the MOP is already stretched to near its limit during pipe manufacture. The belling operation may fail when such MOP feedstock is used in a Rieber belling process, or at the very least, the otherwise desired properties of the MOP may be altered.

S&B Technical Products, Inc./Hultec, the assignee of the present invention, has previously developed specialized sealing gasket designs for PVC-O pipe. These designs are generally referred to as the PRESSURE FIX™, in Europe, and as the MAMBO™ in North America. Although these gaskets have been shown to be effective sealing solutions for PVC-O in many instances, there continue to be instances where MOP and particularly PVC-O pipe is not able to adequately withstand the stresses encountered during pipe belling operations, or in maintaining sealing integrity at pipe joints in field applications.

Whether the pipeline system in question is the more ordinary PVC pipeline, or the more exotic PVC-O pipeline, it is often desirable to provide a "restrained joint" to insure that the spigot or male pipe end and the female or socket end do not separate due to internal or external forces, such as hydraulic forces that exist inside the pipeline, or external forces, such as bends in the direction of the pipeline, earthquakes or ground movement and the like.

As has been discussed, the problem is exacerbated in the case of PVC-O pipe joints in that the prevalent socket end is often provided with an "Anger Raceway" for receiving the sealing gasket. Since an advantage of PVC-O pipe is that it can be thinner with the same type strength as traditional PVC pipe, the Anger Raceway has a different geometry than the traditional socketed grooves provided in the more traditional "Rieber" gasket sealing systems for traditional PVC pipe. This geometry has proved to be more difficult problem from the standpoint of providing a securely sealed joint than the traditional PVC pipe joint.

Prior to describing the sealing and restraint system of the invention, the two commonly used methods for manufacturing PVC-O pipe will now be briefly discussed. Both processes start by extruding a length of PVC-U pipe at a reduced diameter and increased wall thickness, followed by heating the pipe to the glassy transition temperature and expanding it to the desired diameter and wall thickness.

The following is an example of a "batch process" for producing PVC-O pipe:

Extrude a pipe at 50% OD and 200% thickness of desired product. Cut into 7.1 m sections. Insert length of starting stock into a closed mold. This mold is a jacketed cylinder approximately 7.6 meters (25 ft) long including bell-forming segment that is bolted on its end. Each end of the starting stock is "pinched down" and held in place.

Heat the pipe near its glassy transition temperature. Use internal pressure to expand the pipe until it comes in contact with the mold.

Cool the mold. After the pipe hardens again it will undergo thermal contraction so it detaches from the mold surface.

Remove expanded pie from the mold.

Tire pipe is transported to a cutting station where each of the "pinched down" ends is cut off to form the final 6.1 meter (20 ft) laying length.

The following is an example of a "continuous process" for producing PVC-O pipe:

Extrude a pipe, or starting stock, 50% of the desired OD and having twice the wall thickness of the desired finished product.

The starting stock goes through a "conditioning tank" where it is uniformly heated to a desired temperature.

The starting stock is pulled through an "expansion zone" by a second haul-off where further heat brings the stock above the Tg of PVC. Desired dimensions are attained in the expansion zone.

The oriented pipe is cooled in a spray tank.

The oriented pipe is cut to length using a special rotary saw.

The oriented pipe is transported to a belling machine and the bell socket is formed.

Belling and gasket options for commercially available PVC-O pipe may vary, but as has been discussed, a common approach is to form a bell or socket end with an internal circumferential groove for receiving an annular sealing gasket. PVC-O pipe, unlike ordinary PVC-U pipe, is typically provided with what is called a "30/60" internal circumferential groove (the "Anger Groove") for forming a non-restrained joint. The Anger Groove provides a very limited space for any type of joint restraint, and to Applicant's knowledge, there are presently no successful joint restraints in the marketplace for these types of pipe systems. Holding gasket raceway dimensions is difficult in PVC-O pipe, with die belling process being the greatest contributor to scrap. As the PVC-O pipe wall becomes relatively thicker, it becomes more difficult to meet specifications.

Turning now to FIG. 1, there is shown a male or spigot pipe end 11 of one section of PVC-O pipe about to be inserted into the mouth or end opening 13 of a socket or bell pipe end 15 of a second, mating section of PVC-O pipe of the type under consideration, the two sections being shown in somewhat exaggerated fashion for case of illustration.

Figure 2:
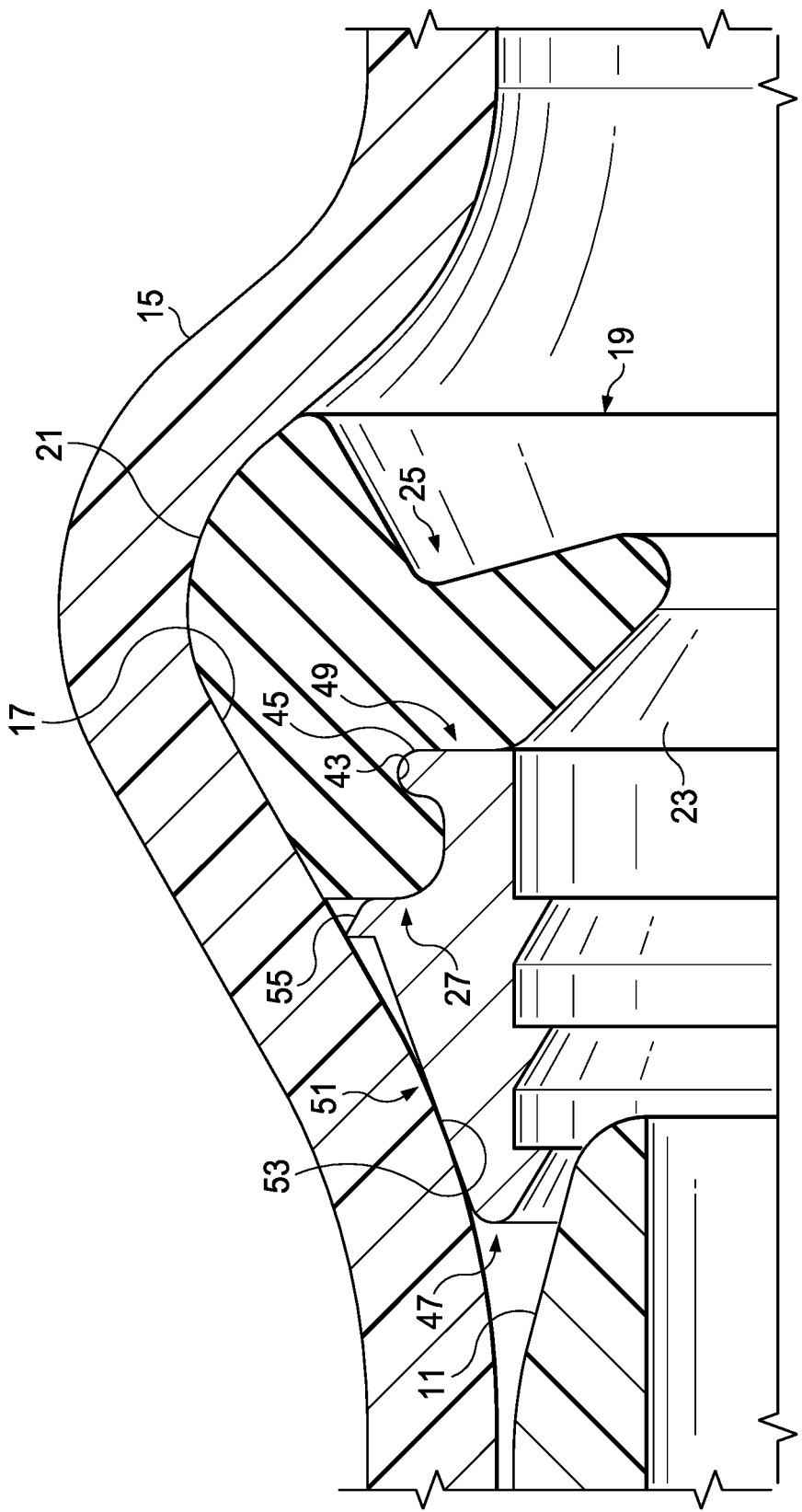
FIG. 2 is a quarter sectional view of the previously described molecularly oriented pipe socket end with the spigot end beginning to be inserted into the socket end.

FIG. 2 is a side, quarter sectional view of the socket pipe end 15 having the sealing and restraint system installed, just as the male or spigot pipe end 11 is about to be made up to form a secure pipe joint. As has been discussed, the female pipe section 15 can be formed of any of a variety of commercially available thermoplastic materials, such as the polyolefin family including polyethylene and polypropylene as well as polyvinyl chloride and similar materials. It may also be a section of molecularly oriented pipe. Thermoplastic pipes of this general type are used in a variety of industrial settings including water, sewage and chemical industries. The gasket receiving raceway 17 has been preformed in the pipe mouth opening 13 at the pipe manufacturing facility, as by using a collapsible mandrel belling tool, or other conventional technology.

Figure 3:
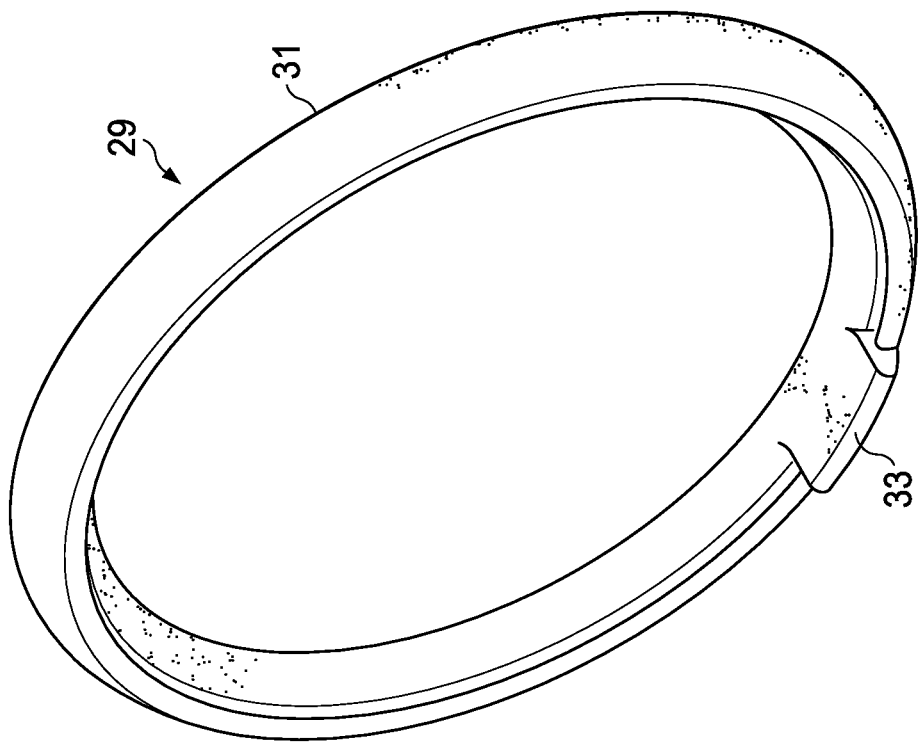
FIG. 3 is an isolated perspective view of the sealing ring used in the sealing and restraint system of the invention.

A particularly preferred form of the sealing gasket 19 which can be used in the method of the invention is shown in profile in FIG. 3 and in cross-section in FIG. 2. Preferably, the gasket 19 is an annular, ring-shaped member having a main gasket body formed of a flexible elastomeric material, such as a suitable natural or synthetic rubber. The elastomeric material used to form the body of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc.

As can be seen in FIG. 2, the main gasket body includes an outer convex sealing surface 21. The main gasket body also includes a lower, primary sealing surface 23. In the version of the invention shown, the primary sealing surface 23 is an evenly sloping face of the gasket body which forms a traditional lip seal region for the gasket. The lip region is separated from the outer convex sealing surface 27 and trailing tail portion by a V-shaped recess (shown generally as 25 in FIG. 2). The V-shaped recess allows the lip region of the gasket body to bend inwardly as the mating male, spigot end of a mating pipe section encounters the primary sealing surface 23 of the gasket (see FIGS. 8-10). Again referring to FIG. 2, the main gasket body also has a leading nose region, designated generally as 27 in FIG. 2. The leading nose region 27 faces generally towards the mouth opening of the female socket end of the pipe once the gasket is inserted within the pipe. The sealing surface 25 could also conceivably comprise a Acompression® sealing surface, as will be familiar to those skilled in the relevant arts.

The sealing gasket which has been described has a number of conventional features which are common to such designs in the prior art. However, the sealing gasket which is used in the sealing and restraint system of the invention also has a number of unique features, in part because of a unique "interaction" which exists between the sealing ring and the gripping ring component of the system of the invention. As can be appreciated from FIG. 3, the sealing gasket of the invention comprises an elastomeric sealing ring 29 having a periphery 31 and having a protruding ear 33 located at one circumferential location about the periphery thereof. The "protruding ear" 33 forms a shelf-like projection which extends generally perpendicularly outward from the remaining circumference of die gasket body for a short distance. As will be appreciated from FIGS. 6A-6D, the, the sealing element is installed in the raceway 17 by temporarily collapsing the sealing gasket inwardly upon itself and positioning the gasket element in the raceway, and thereafter allowing the sealing element to return to a normal uncollapsed state.

Figure 4:
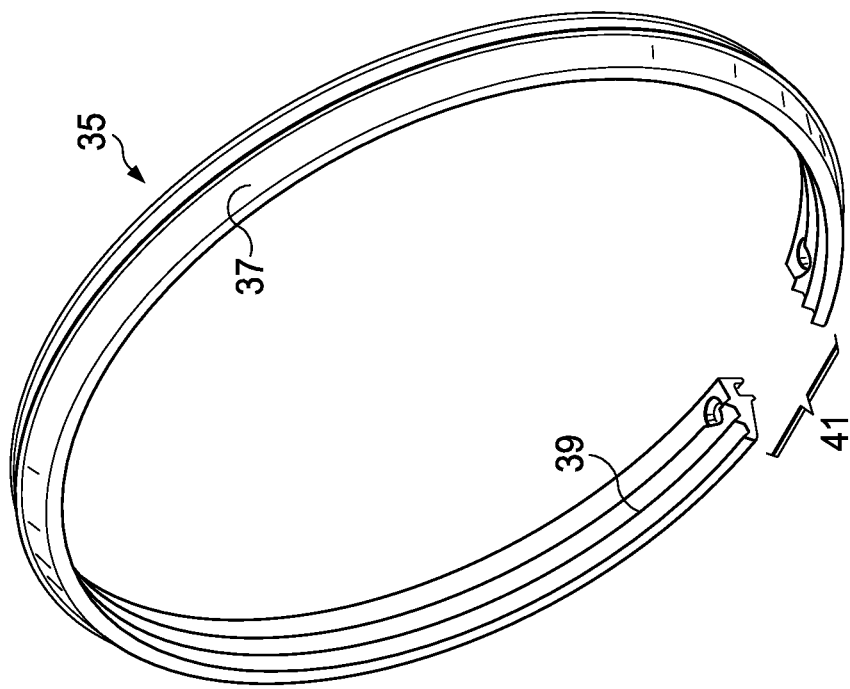
FIG. 4 is a similar isolated perspective view of the gripping ring which is used in the sealing and restraint system of the invention.

Turning to FIG. 4, the significance of the protruding ear on the sealing ring will become apparent. The gripping ring 35 which forms an additional component of the sealing and restraint system of the invention is a companion restraining element which is co-located within the raceway (17 in FIG. 2) of the socket end of the same section of pipe. The restraining element comprises a hardened gripping ring having an external peripheral surface 37 and an internal peripheral gripping surface 39, the griping ring having an opening gap 41 at one circumferential location about the periphery thereof. The gripping ring 35 is preferably formed of a hard metal, such as a corrosion resistant stainless steel, but could also be made from other hard metallic materials or alloys, or even from a hard plastic or composite. The internal peripheral gripping surface 39 is preferably provided with rows of gripping teeth which can grip the exterior surface of the mating male, spigot pipe end as the pipe joint is being assembled. The rows of teeth on the internal peripheral surface of the gripping ring can be of equal length or can be of odd lengths and can be arranged in either a uniform or non-uniform pattern about the inner circumference of the hardened ring. Preferably, the teeth of the hardened ring 35 are angled away from the horizontal axis of the joint at an angle of less than 90 degrees.

Figure 7A:
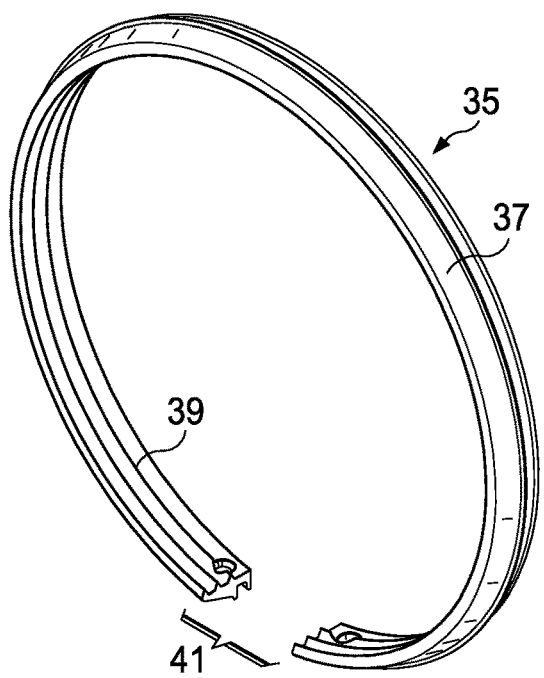
FIGS. 7A-7F are similar views showing the installation of the gripping ling in the raceway of the socket section of plastic pipe.
Figure 7B:
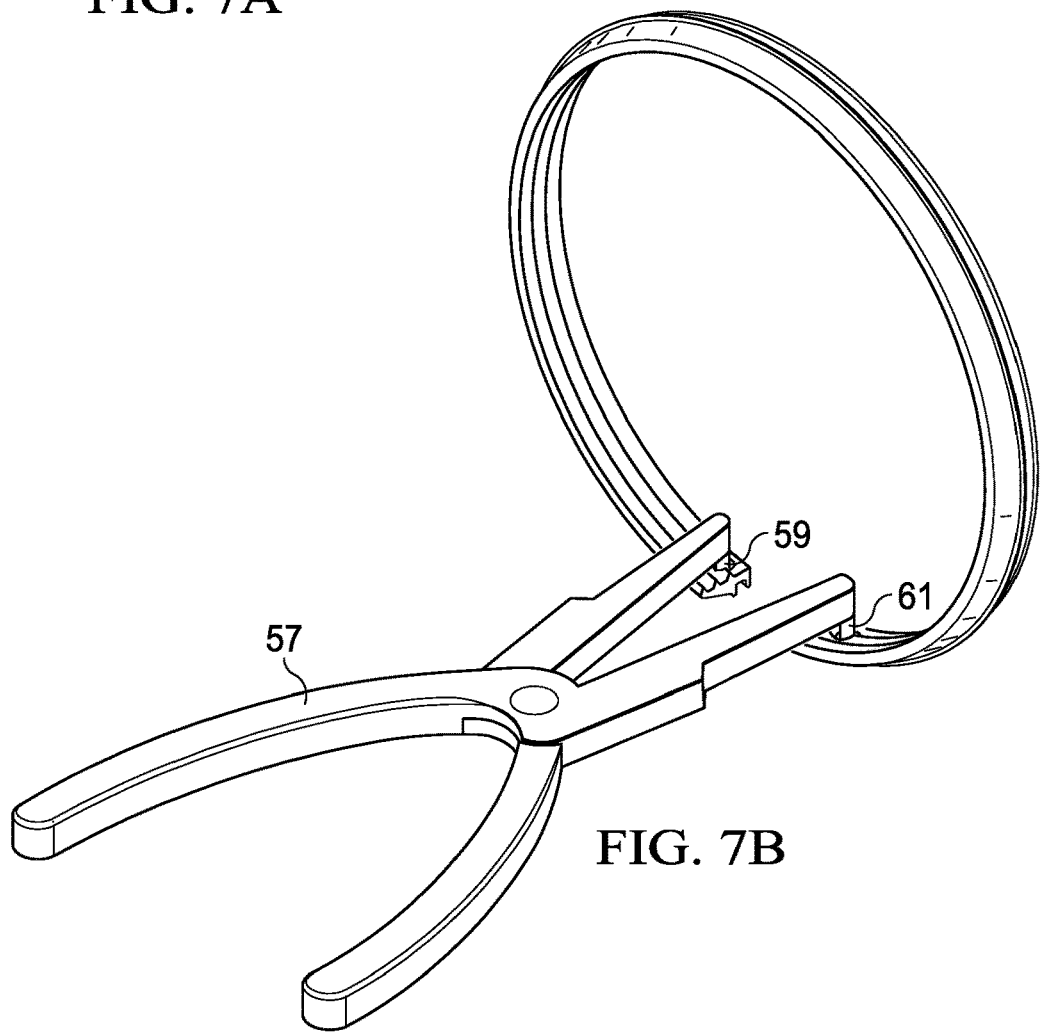
Figure 7C:
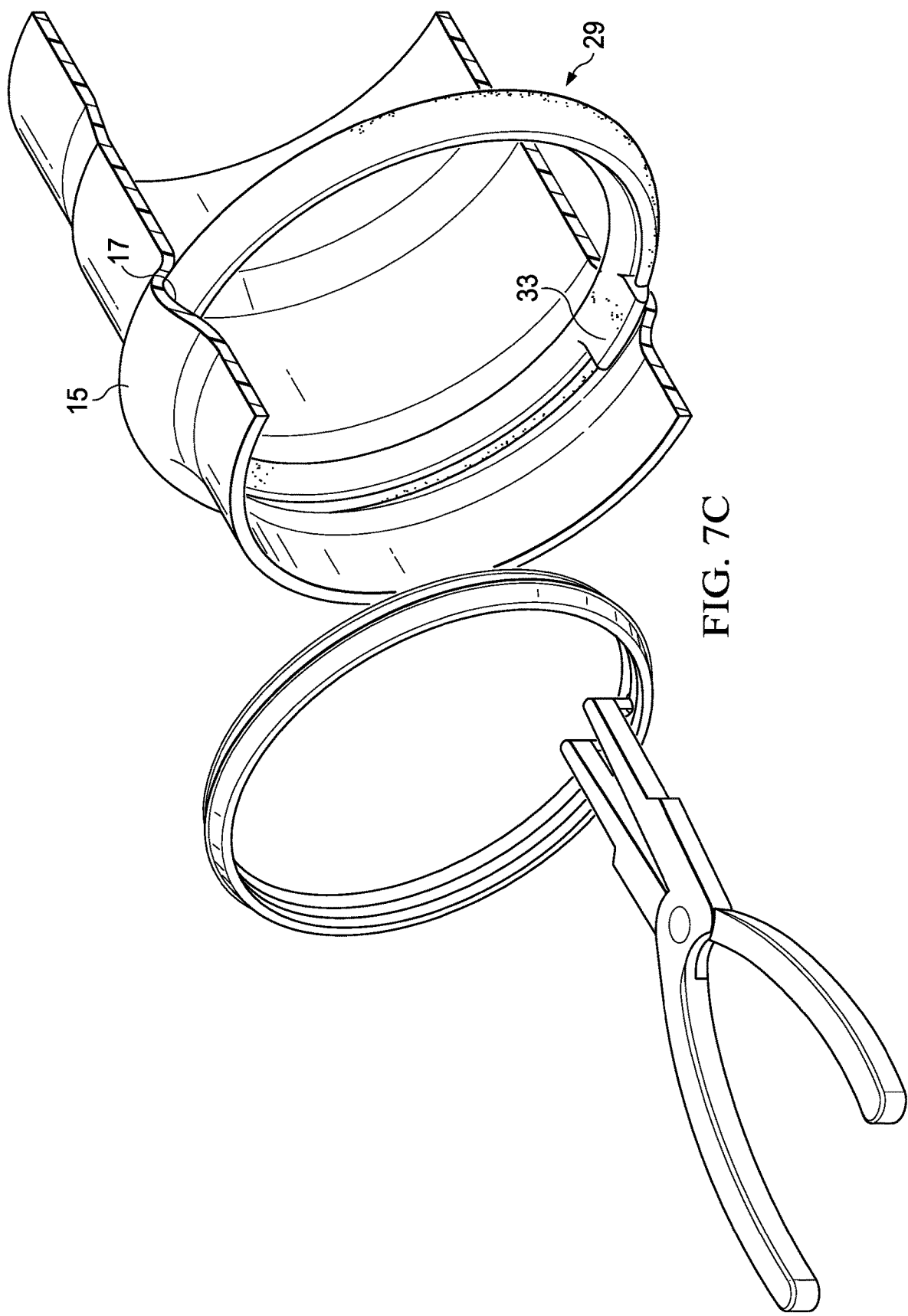

It will be appreciated from FIGS. 7A-7C that the gripping ring 35 of the invention thus has an external diameter and an internal diameter, and wherein the opening gap 41 in the gripping ring can be forced closed to thereby temporarily decrease the external diameter of the gripping ring, so that it can be positioned within the raceway 17 in the socket end of the plastic pipe.

It will be seen from FIGS. 3-4 that the sealing ring 29 and the gripping ring 35 also have Ainterlocking Profiles® which help to ensure retention of the sealing ring by the gripping ring after the sealing ring and gripping ring have been installed in the raceway within the socket end of the plastic pipe. In other words, the outer circumferential region (shown generally at 21 in FIG. 2) forms a seal with the raceway 17 and the inner circumferential region (generally at 23) forms a sealing surface for an exterior surface of the mating spigot pipe end 11. A circumferential groove region 43 is formed on the inner circumferential region of the gasket body which engages with a mating lip surface 45 provided on the gripping ring to form the interlocking profile.

As will be appreciated from FIG. 2, the preferred gripping ring 35 has a leading nose region 47 and a trailing tail region 49, as viewed in profile. The external peripheral surface (37 in FIG. 4) of the gripping ring 35 includes a sloping region (51 in FIG. 2) which interfaces with a mating sloping surface 53 provided in the raceway 17 of the socket pipe end at a given interface angle. The interface angle will typically be in the range from about 10 to 30 degrees, preferably about 15 to 20 degrees. It will also be noted from FIG. 2 that the external peripheral surface 37 of the gripping ring 35 also has a sharp circumferential protrusion 55 which limits forward displacement of the gripping ring as it contacts the socket raceway 17, to thereby restrict the amount the gripping ring grips the pipe spigot end as the joint is being assembled.

FIGS. 6A-6D illustrate the steps involved in the assembly of a sealing and restraint system of the invention used in joining a first longitudinal section of plastic pipe to a second longitudinal section of plastic pipe to form a secure pipe joint. As previously described, each of the sections of plastic pipe each has a spigot for muting with a socket end of a next adjacent pipe section, the socket ends each being preformed with an internal raceway formed adjacent a mouth opening thereof which is formed during the manufacture of the pipe section.

Figure 6A:
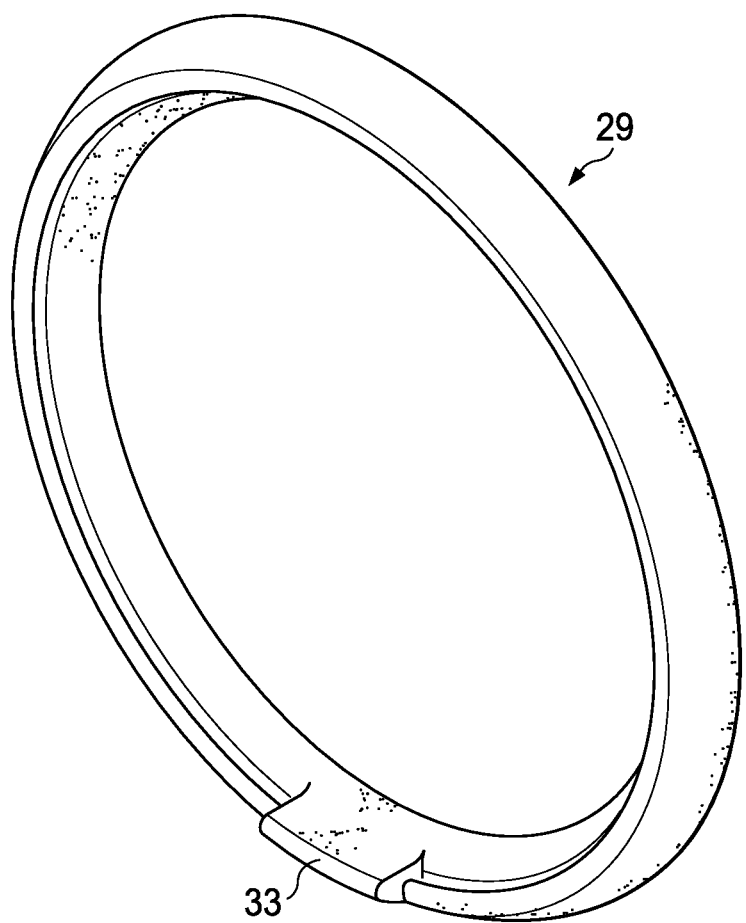
FIGS. 6A-6D are simplified views showing the installation of the sealing ring of FIG. 3 into the raceway formed in adjacent the mouth opening of the socket end of the plastic pipe section.
Figure 6B:
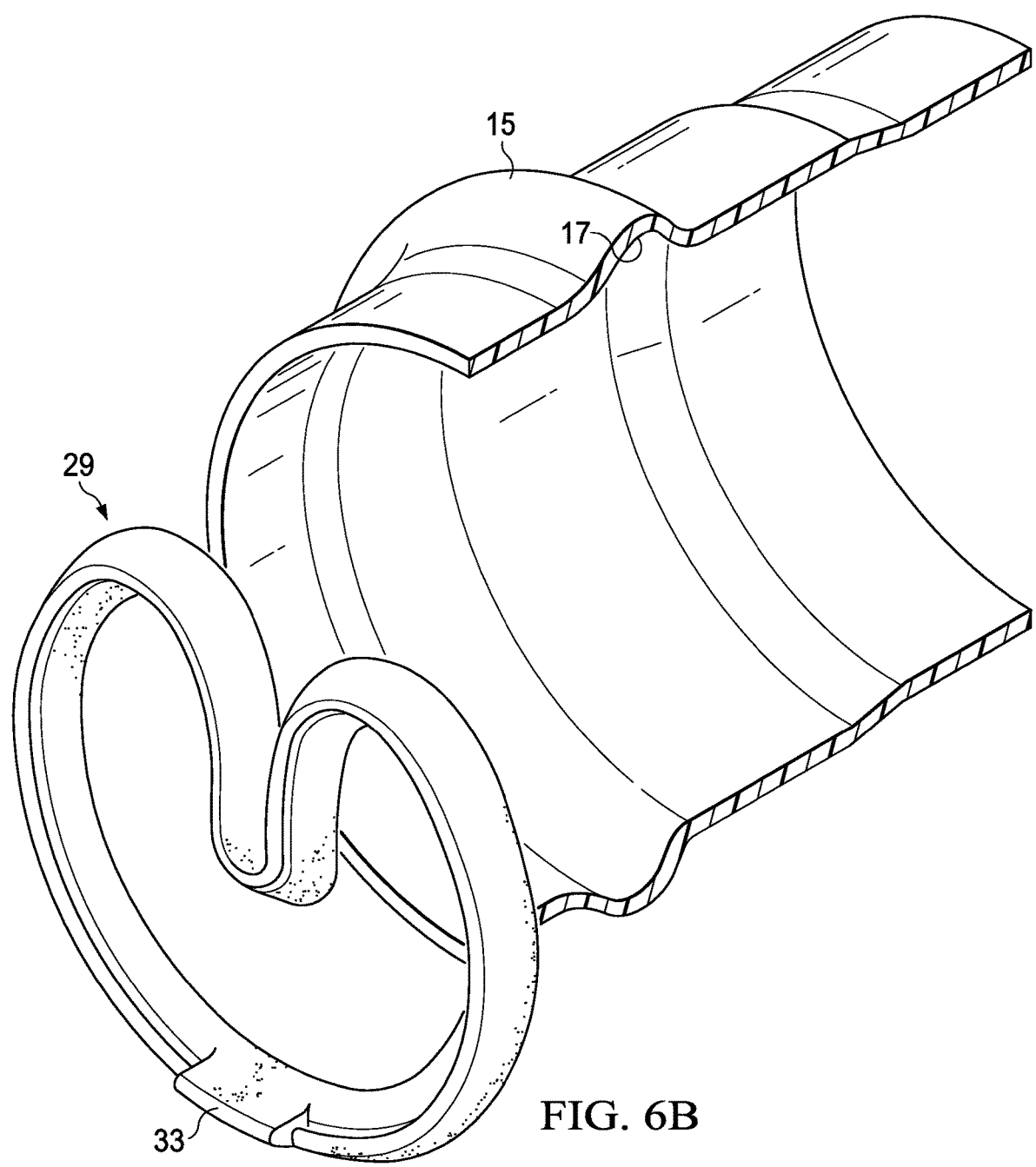
Figure 6C:
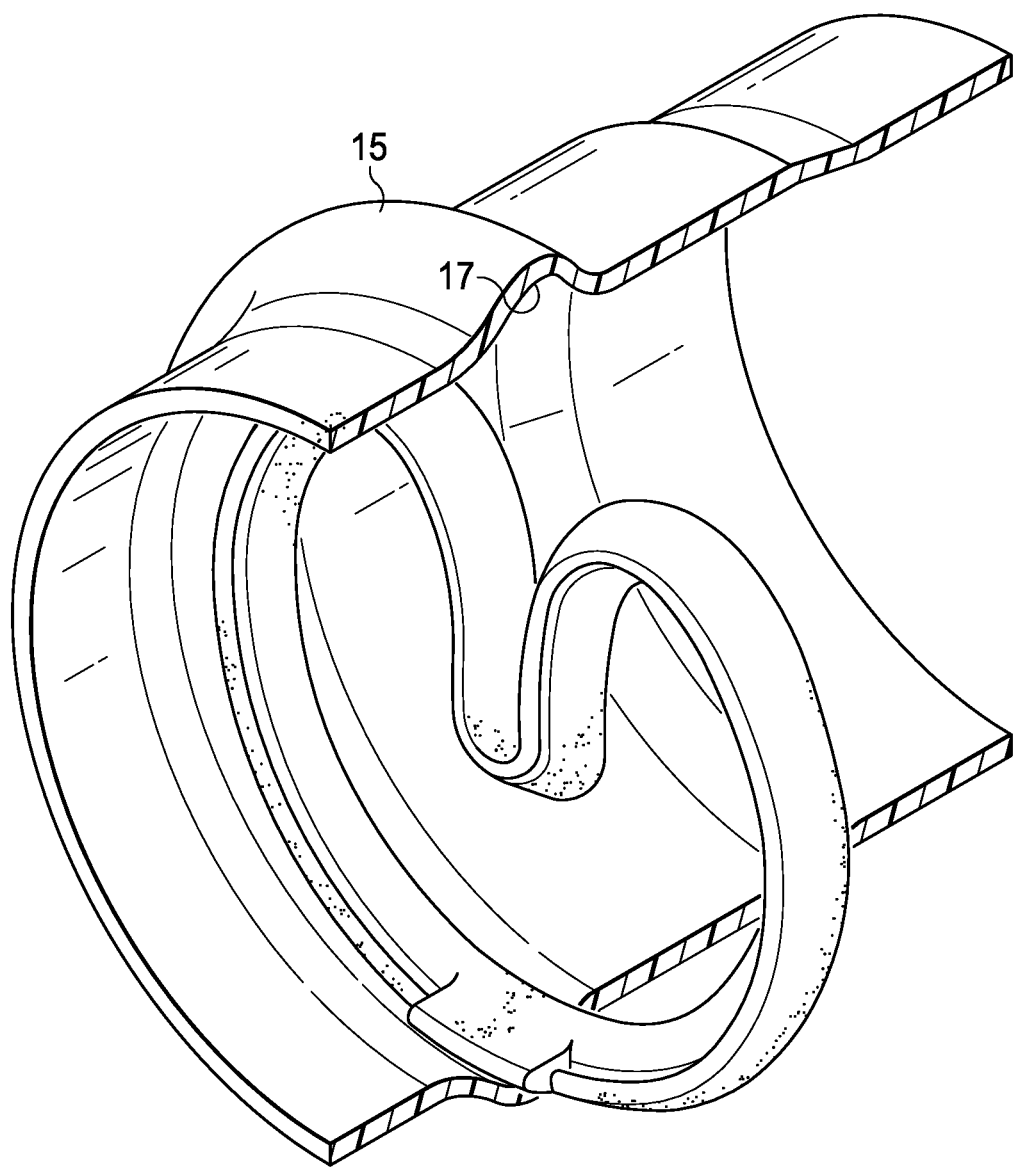
Figure 6D:
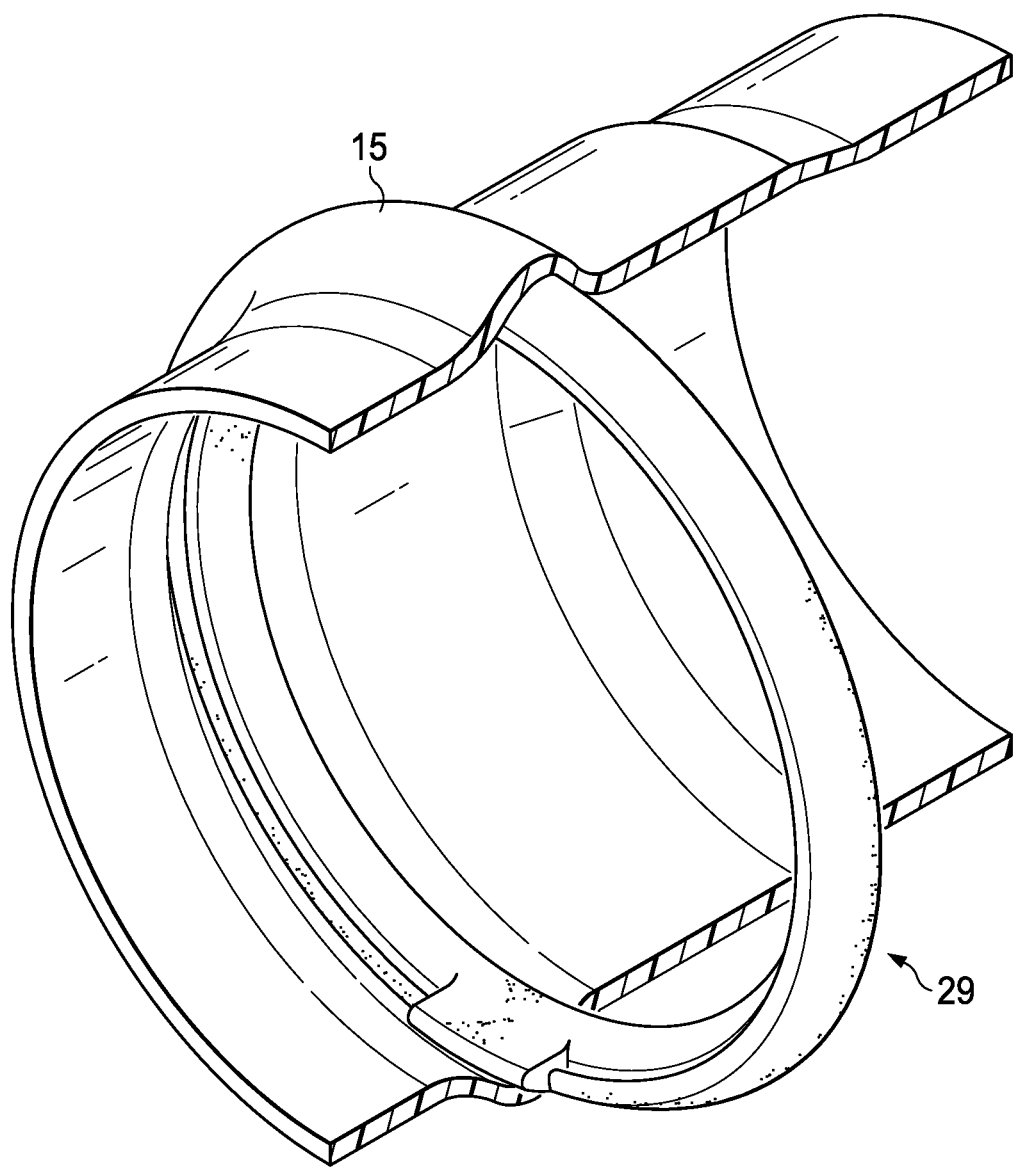

In the first step in the method of the invention, the sealing element 29 is installed within the raceway 17 of the socket end 15 of one section of plastic pipe by temporarily collapsing the sealing element inwardly upon itself and positioning the sealing element in the raceway, and thereafter allowing the sealing element to return to a normal uncollapsed state. FIGS. 6A-6C show the sealing element being collapsed inwardly upon itself, while FIG. 6D shows the gasket having returned to its normal uncollapsed state.

Figure 7D:
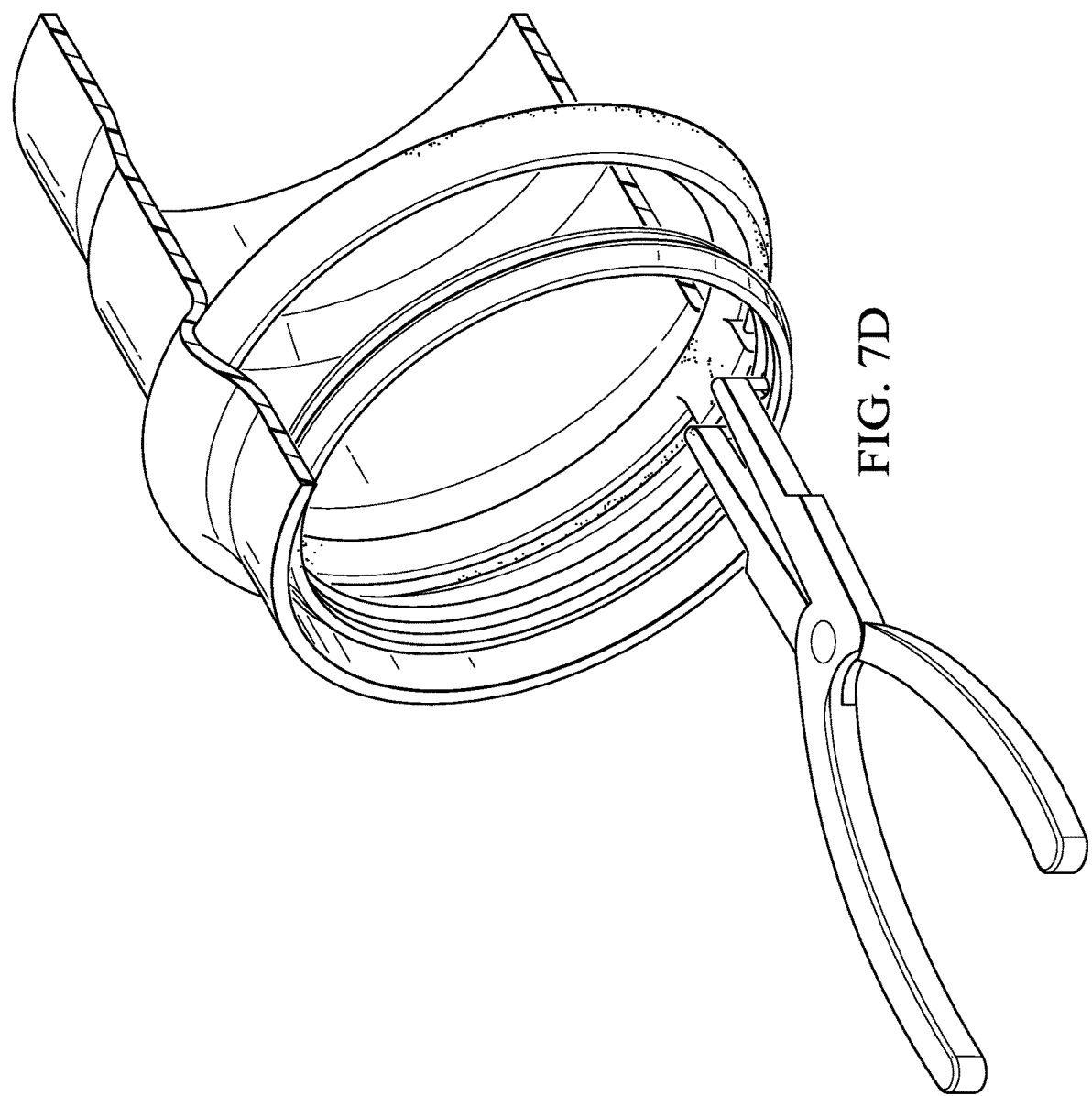
Figure 7E:
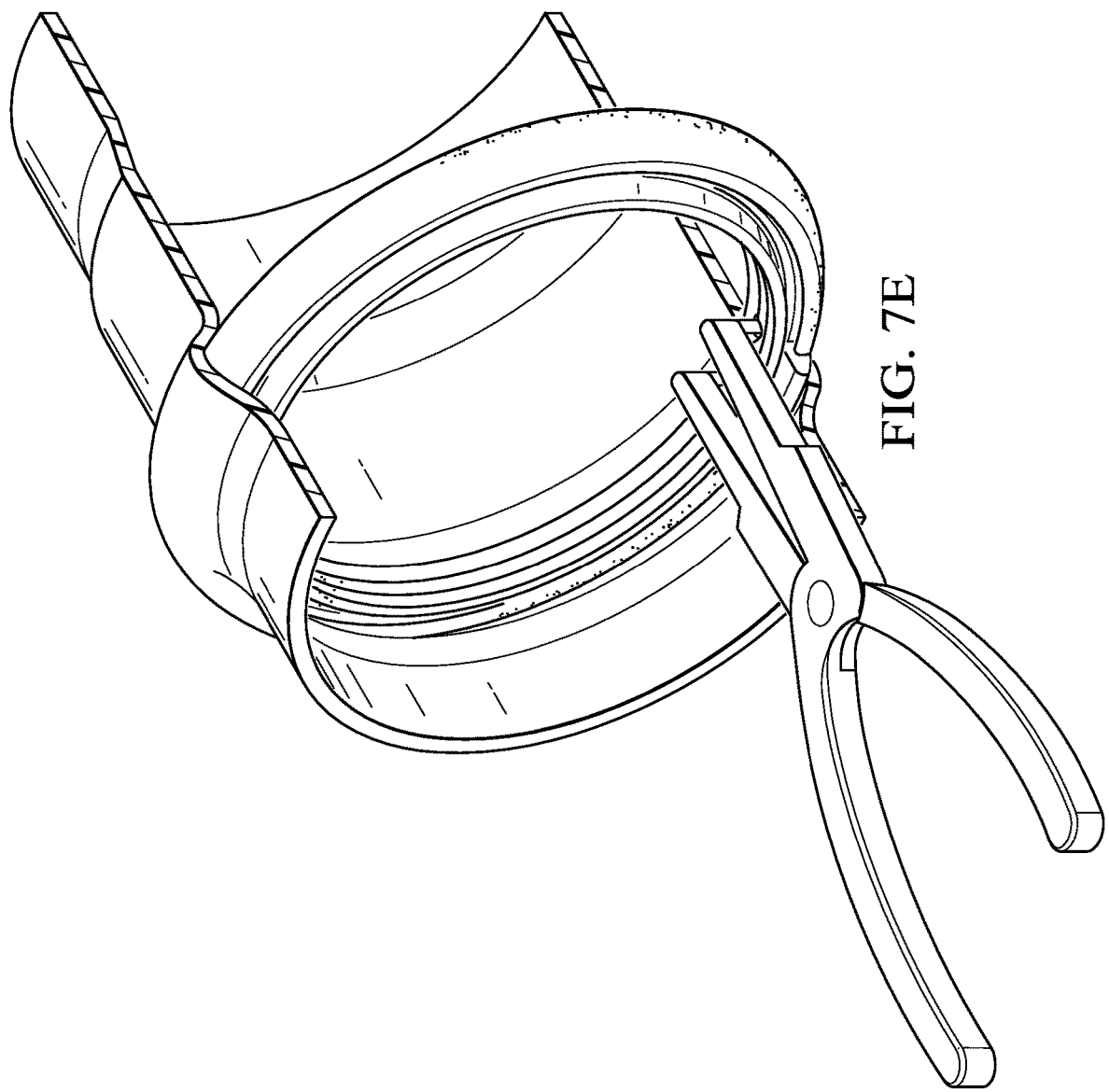
Figure 7F:
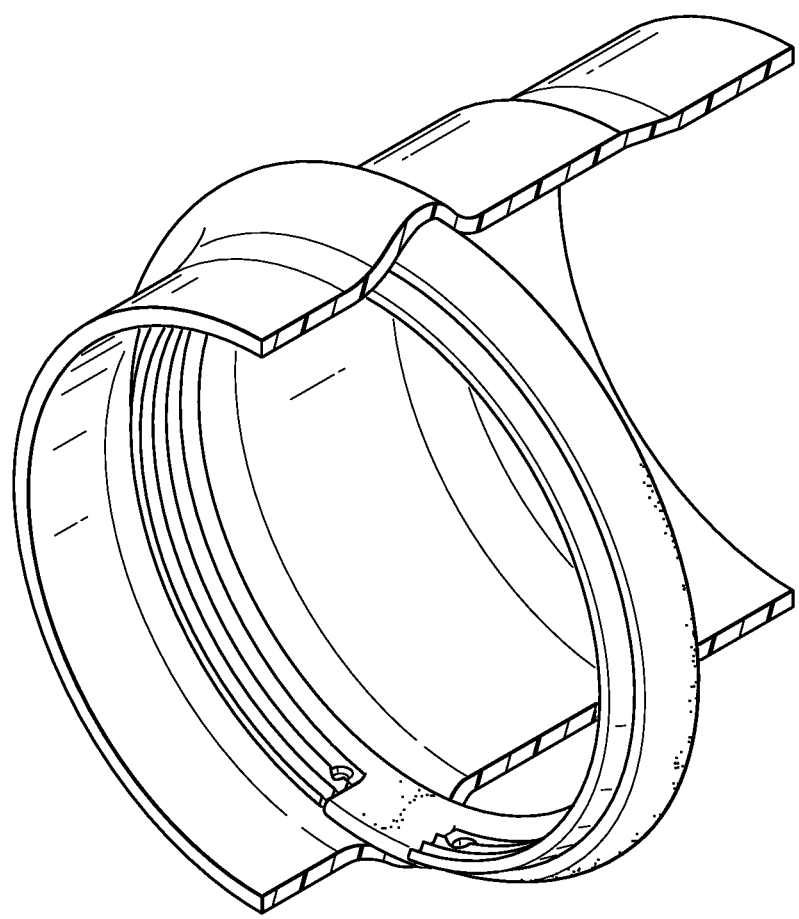

In the next series of steps in the method of the invention, the previously described restraining element 35 is installed within the raceway 17 of the socket end of the same section of pipe. As demonstrated in FIGS. 7A-7F, the opening gap 41 in the hardened ring 35 is first temporarily closed, reducing the external diameter of the ring and allowing it to be positioned within the raceway 17 of the socket pipe end. In FIGS. 7A-7C, this is shown as being accomplished by using a pair of pliers 57 with a pair of engagement elements (generally at 59, 61 in FIG. 7B) to engage openings in the hardened ring 35, allowing the ring to be closed, as shown in FIG. 7C. FIGS. 7D-7F show the steps of further installing the collapsed gripping ring 35 within the raceway 17.

Figure 5:
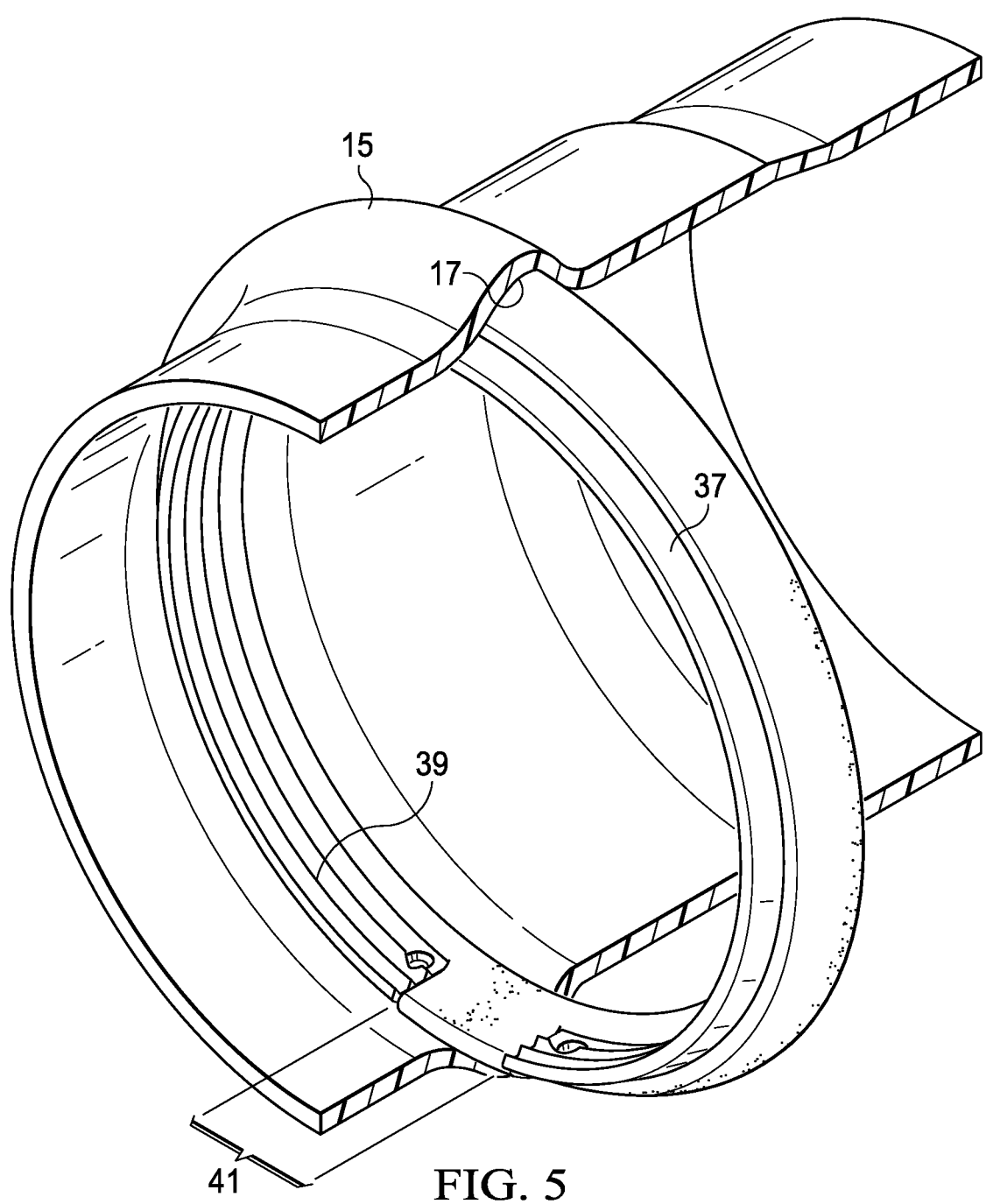
FIG. 5 is an isolated view of a partly broken away socket section of plastic pipe having the sealing and gripping rings inserted in a raceway adjacent the mouth opening of the socket.

As shown in FIGS. 5 and 7F, the protruding ear 33 of the sealing ring 29 engages and fits within the opening gap 41 in the gripping ring 35 when the gripping ring is installed within the raceway of the socket end of the section of plastic pipe. Tire engagement of the protruding ear within the opening gap serves to prevent extrusion of the sealing ring within the gap in the gripping ring and also limits closure of the gripping ring after engagement of the spigot end with the socket pipe end as the pipe joint is assembled.

FIGS. 8-10 illustrate, in simplified fashion, the assembly of the sealing and restraint system of the invention. In this case, the female, socket pipe end 15 is provided with an optional reinforcing strap 63 which could be of metal or plastic. FIG. 8 shows the spigot beginning to enter the mouth opening of the socket and approach the gripping ring as the sealing gasket is in the initial, installed position, in FIG. 9, the spigot end 11 forces the gripping ring gap 41 to open further and pushes it back, along with the sealing gasket. In FIG. 10, the spigot can be seen to have deformed the sealing ring while confining it to the spigot raceway 17 as the assembly is completed.

Figure 12:
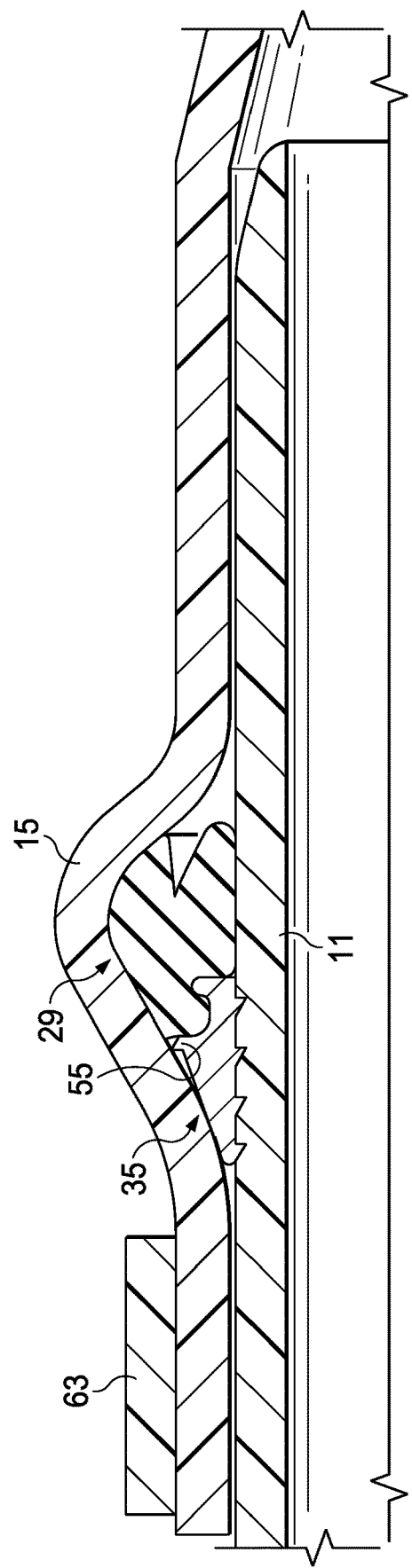

FIGS. 11 and 12 are intended to illustrate. In simplified fashion, the performance of the sealing and restraint system of the invention in use. FIG. 11 shows the joint state after completing assembly. The gripping ring 35 is in the "open state" to allow the spigot to be installed. The gripping ring "stop" protrusion 55 is separated from the socket raceway 17, allowing outward displacement. In FIG. 12, the gripping surface of the gripping ring engages the exterior surface of the mating male spigot pipe end, as axial thrust tends to pull the spigot outwardly. Friction between the spigot pipe end and the gripping ring tends to drag the gripping ring outwardly with the spigot pipe end. As the gripping ring moves outwardly, it slides along the socket exterior surface, which forces it to close and grip the spigot.

An invention has been provided with several advantages. The method for installing a sealing and restraint system of the invention allows a pipe gasket and companion gripping ring to be installed within a preexisting and preformed groove in a thermoplastic pipe. Because the components of the system are inserted within a preformed pipe groove or raceway, the manufacturing and installation processes are simplified and made less costly. The sealing and restraint system of the invention provides a simple and economical way to join molecularly oriented pipe, such as PVC-O pipe, as well as providing a restrained joint for PVC-O pipe. The approach avoids many of the problems involved in belling PVC-O pipe, or in attempting to use a Rieber type belling process. The method is simpler and more economical than using an external coupling or external restraints. The presence of the external stop on the gripping ring prevents the gripping ring from further sliding along the socket during assembly and closing around the spigot which could eventually damage the pipe and affect the joint restraint. The protruding regions on the gripping ring make contact with the socket as the gripping ring moves forward, preventing further sliding along the socket surface while also transferring a portion of the axial load to the pipe socket. The "protruding ears" on the sealing ring fill the space created by the gap opening in die gripping ring, thereby preventing excessive closure of the gripping ring as the pipe joint is made up.

While the invention has been shown in several of its forms, it is not thus limited but is susceptible to various changes and modifications without departing from the spirit thereof.

What is claimed is:

1. A method of joining a first longitudinal section of plastic pipe to a second longitudinal section of plastic pipe to form a secure pipe joint, each of the sections of plastic pipe each having a spigot for mating with a socket end of a next adjacent pipe section, the socket ends each being preformed with an internal raceway formed adjacent a mouth opening thereof which is formed during the manufacture of the pipe section, the method comprising the steps of:

first, installing a sealing element within the raceway of the socket end of one section of plastic pipe, the sealing element comprising an elastomeric sealing ring having a periphery and having a protruding ear located at one circumferential location about the periphery thereof, the sealing element being installed by temporarily collapsing the sealing element inwardly upon itself and positioning the sealing element in the raceway, and thereafter allowing the sealing element to return to a normal uncollapsed state;

next, installing a restraining element within the raceway of the socket end of the same section of pipe, the restraining element comprising a hardened gripping ring having an external peripheral surface and an internal peripheral gripping surface, the griping ring having an opening gap at one circumferential location about the periphery thereof;

wherein the protruding ear of the sealing ring engages and fits within the opening gap in the gripping ring when the gripping ring is installed within the raceway of the socket end of the section of plastic pipe, whereby engagement of the protruding ear within the opening gap serves to prevent extrusion of the sealing ring within the gap in the gripping ring and also limits closure of the gripping ring after engagement of the spigot end with the socket pipe end as the pipe joint is assembled.

2. The method of claim 1, wherein the two sections of plastic pipe are molecularly oriented plastic pipe.

3. The method of claim 1, wherein the gripping ring has an external diameter and an internal diameter, and wherein the opening gap in the gripping ring can be forced closed to thereby temporarily decrease the external diameter of the gripping ring, so that the gripping ring can be positioned within the raceway in the socket end of the plastic pipe.

4. The method of claim 1, wherein the sealing ring and the gripping ring are provided with interlocking profiles which help to ensure retention of the sealing ring by the gripping ring after the sealing ring and gripping ring have been installed in the raceway within the socket end of the plastic pipe.

5. The method of claim 1, wherein the internal peripheral gripping surface of the gripping ring comprises a series of gripping teeth which allow movement of a mating spigot pipe end within the mouth opening of the spigot pipe end in a first longitudinal direction as the pipe joint is being assembled, but which restrain movement in a second, opposite longitudinal direction.

* * * * *